(12) United States Patent
Tseng

(10) Patent No.: US 9,091,826 B2
(45) Date of Patent: Jul. 28, 2015

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/051,468

(22) Filed: Oct. 11, 2013

(65) Prior Publication Data
US 2015/0016776 A1    Jan. 15, 2015

(30) Foreign Application Priority Data

Jul. 9, 2013 (TW) .............................. 102124455 A

(51) Int. Cl.
*G02B 6/32* (2006.01)
*G02B 6/43* (2006.01)
*G02B 6/42* (2006.01)

(52) U.S. Cl.
CPC ............ *G02B 6/4204* (2013.01); *G02B 6/4274* (2013.01)

(58) Field of Classification Search
CPC ... G02B 6/4257; G02B 6/4259; G02B 6/4204
See application file for complete search history.

(56) References Cited

U.S. PATENT DOCUMENTS

2009/0226130 A1 * 9/2009 Doany et al. ..................... 385/14
2011/0044369 A1 * 2/2011 Andry et al. .............. 372/50.124

* cited by examiner

*Primary Examiner* — Omar R Rojas
(74) *Attorney, Agent, or Firm* — Novak Druce Connolly Bove + Quigg LLP

(57) ABSTRACT

An optical communication device includes a connector, a first substrate, a first driving chip, a light emitting element, a second driving chip, a light receiving element, a coupling lens assembly, and an optical waveguide. The first substrate is supported on the connector and electrically connected to the connector. The first substrate includes a bottom surface and a supporting surface facing away from the bottom surface. Both the light emitting element and the light receiving element are received in the first substrate. The first driving chip is supported on the supporting surface, and electrically connected to the first substrate and the light emitting element. The second driving is supported on the supporting surface, and electrically connected to the first substrate and the light receiving element. The coupling lens assembly is detachably connected to the first and second driving chips. The optical waveguide is detachably connected to the coupling lens assembly.

11 Claims, 1 Drawing Sheet

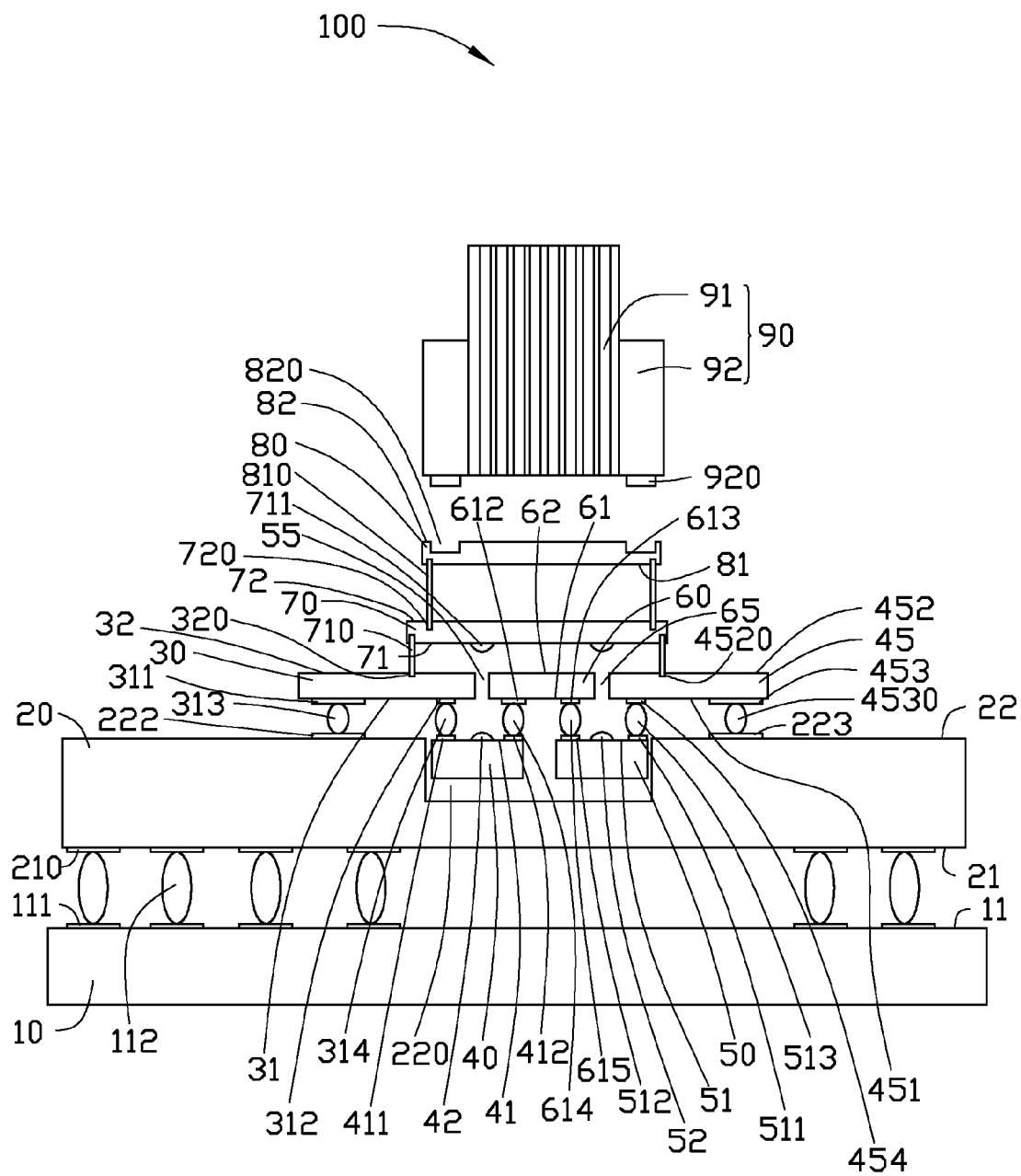

OPTICAL COMMUNICATION DEVICE

BACKGROUND

1. Technical Field

The present disclosure relates to an optical communication device.

2. Description of Related Art

An optical communication device includes a substrate, at least one photoelectric element positioned on the substrate for emitting/receiving electrical signals, and a light waveguide transmitting optical signals. The photoelectric element emits/receives optical signals with a transmitting direction substantially perpendicular to the substrate, and a transmitting direction of optical signals in the light waveguide is substantially parallel to the substrate. Therefore, a transmitting direction of optical signals should be deflected for substantially 90 degrees to optically couple the photoelectric element with the light waveguide. In the current optical communication device, a complex coupler is adapted to deflect a transmitting direction of optical signal for 90 degrees for optically coupling the photoelectric element with the light waveguide. However, the coupler increases an assembling difficulty and cost of the optical communication device.

Therefore, it is desirable to provide an optical communication device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a connector 10, a first substrate 20, a first driving chip 30, a light emitting element 40, a second driving chip 45, a light receiving element 50, a second substrate 60, a coupling lens assembly 70, a transparent bracket 80, and a planar optical waveguide 90.

The connector 10 includes a connection surface 11 and a number of first connection pads 111 formed on the connection surface 11.

The first substrate 20 is supported on the connection surface 11 and electrically connected to the connector 10. In particular, the first substrate 20 includes a bottom surface 21 facing the connection surface 11, and a supporting surface 22 facing away from the bottom surface 21. The supporting surface 22 is substantially parallel with the bottom surface 21.

The first substrate 20 includes a number of second connection pads 210 formed on the bottom surface 21. Each second connection pad 210 spatially corresponds to one of the first connection pads 111. Each second connection pad 210 is supported on and electrically connected to one of the first connection pads 111 through a first connection ball 112.

The supporting surface 22 defines a receiving cavity 220. The first substrate 20 also includes a second connection pad 222 and a third connection pad 223. In the embodiment, the second connection pad 222 and the third connection pad 223 are formed on the supporting surface 22, and are symmetrical about the receiving cavity 220.

The first driving chip 30 is supported on the supporting surface 22 and electrically connected to the first substrate 20. In particular, the first substrate 30 includes a first surface 31 facing the supporting surface 22, and a second surface 32 facing away from the first surface 31. The first driving chip 30 includes a fourth connection pad 311 and a fifth connection pad 312. Both the fourth connection pad 311 and the fifth connection pad 312 are formed on the first surface 31. The fourth connection pad 311 is supported on and is electrically connected to the second connection pad 222 through a second connection ball 313. The second surface 32 defines a first location hole 320.

The light emitting element 40 includes a light emitting surface 41 and a first light condensing lens 42 formed on the light emitting surface 41. In the embodiment, the light emitting element 40 is a laser diode, and includes a sixth connection pad 411 and a seventh connection pad 412. In the embodiment, the sixth connection pad 411 and the seventh connection pad 412 are formed on the light emitting surface 41 and symmetrical about the first light condensing lens 42. The light emitting element 40 is received in the receiving cavity 220, with the sixth connection pad 411 being electrically connected to the fifth connection pad 312 of the first driving chip 30 through a third connection ball 314.

The second driving chip 45 is supported on the supporting surface 22 and electrically connected to the first substrate 20. In particular, the second substrate 45 includes a third surface 451 facing the supporting surface 22, and a fourth surface 452 facing away from the third surface 451. The second driving chip 45 includes an eighth connection pad 453 and a ninth connection pad 454. Both the eighth connection pad 453 and the ninth connection pad 454 are formed on the third surface 451. The eighth connection pad 453 is supported on and electrically connection to the third connection pad 223 through a fourth connection ball 4530. The fourth surface 452 defines a second location hole 4520.

The light receiving element 50 includes a light receiving surface 51 and a second light condensing lens 52 formed on the light receiving surface 51. In the embodiment, the light receiving element 50 is a photo diode, and includes a tenth connection pad 511 and an eleventh connection pad 512. In the embodiment, the tenth connection pad 511 and the eleventh connection pad 512 are formed on the light receiving surface 51 and symmetrical about the second light condensing lens 52. The light receiving element 50 is also received in the receiving cavity 220, with the tenth connection pad 511 being electrically connected to the ninth connection pad 454 of the second driving chip 45 through a fifth connection ball 513.

The second substrate 60 is supported on the first driving chip 30 and the second driving chip 45. The second substrate 60 includes an upper surface 61 and a lower surface 62 facing away from the upper surface 61. The second substrate 60 also includes a twelfth connection pad 612 and a thirteenth connection pad 613. Both the twelfth connection pad 612 and the thirteenth connection pad 613 are formed on the lower surface 61. The twelfth connection pad 612 is supported on and electrically connected to the seventh connection pad 412 of the light emitting element 40 through a sixth connection ball 614. The thirteenth connection pad 613 is supported on and electrically connected to the eleventh connection pad 512 of the light receiving element 50 through a seventh connection ball 615.

The second substrate 60 is positioned between the first driving chip 30 and the second driving chip 45. The second substrate 60 and the first driving chip 30 are spaced from each other, and a first light guiding hole 55 is defined therebetween. The first light guiding hole 55 aligns with the first light condensing lens 42. The second substrate 60 and the second driving chip 45 are spaced from each other, and a second light guiding hole 65 is defined therebetween. The second light guiding hole 65 aligns with the second light condensing lens 52.

The coupling lens assembly 70 is connected to the first driving chip 30 and the second driving chip 45. In particular, the coupling lens assembly 70 includes a first connection surface 71 and a second connection surface 72 facing away from the first connection surface 71. The first connection surface 71 faces the first driving chip 30 and the second driving chip 45. The second connection surface 72 defines two third location holes 720.

The coupling lens assembly 70 includes two first locating posts 710 substantially perpendicularly extending from the first connection surface 71. The first locating posts 710 spatially correspond to the first locating hole 320 of the first driving chip 30 and the second locating hole 4520 of the second driving chip 45, respectively. In assembly, the two first locating posts 710 are respectively inserted into the first locating hole 320 and the second locating hole 4520 to assemble the coupling lens assembly 70 onto the first driving chip 30 and the second driving chip 45.

The coupling lens assembly 70 also includes two light coupling lenses 711 forming on the first connection surface 71. One of the light coupling lenses 711 aligns with the first light guiding hole 55 and the first light condensing lens 42, the other light coupling lens 711 aligns with the second guiding hole 65 and the second light condensing lens 52. In the embodiment, each of the light coupling lenses 711 is a convex lens. The coupling lens assembly 70 is made of transparent material, such as glass. The two light coupling lenses 711 are integrally formed with the coupling lens assembly 70.

The transparent bracket 80 is made of glass or transparent rubber. The transparent bracket 80 is supported on the second connection surface 72. The transparent bracket 80 includes a fifth surface 81 facing the second connection surface 72, and a sixth surface 82 facing away from the fifth surface 81. The transparent bracket 80 includes two second locating posts 810 substantially perpendicularly extended from the fifth surface 81. The two second locating posts 810 spatially correspond to the two third locating holes 720 of the coupling lens assembly 70, respectively. In assembly, the two second locating posts 810 are respectively inserted into the third locating hole 720 to assemble the transparent bracket 80 onto the second connection surface 72 of the coupling lens assembly 70. The sixth surface 82 defines two fourth locating holes 820.

The planar optical waveguide 90 includes a light guiding portion 91 and a fixing portion 92 surrounding the light guiding portion 91. The planar optical waveguide 90 is supported on the sixth surface 82 of transparent bracket 80. In particular, two third locating posts 920 extend from the fixing portion 92, and spatially correspond with the two fourth locating holes 820. In assembly, the two third locating posts 920 are inserted into the fourth locating holes 820 to assemble the planar optical waveguide 90 onto the sixth surface 82 of the transparent bracket 80. The light guiding portion 91 aligns with the two light coupling lenses 711, the first light guiding hole 55, the second light guiding hole 65, the first light condensing lens 42, and the second light condensing lens 52.

In use, the first driving chip 30 sends a driving signal to drive the light emitting element 40 to emit light beams. The light beams emitted by light emitting element 40 are condensed by the first light condensing lens 42 and are directed into the light coupling lenses 711 through the first light guiding hole 55, and finally directed into the light guiding portion 91 of the planar optical waveguide 90 through the transparent bracket 80. As such, the light beams are finally transmitted into another optical communication device (not shown) by the planar optical waveguide 90. A process of the light receiving element 50 receiving light is the reverse of that of the light emitting element 40 emitting light.

In other embodiments, the first light condensing lens 42 and the second light condensing lens 52 can be omitted if the light is not required to be condensed.

In other embodiments, the transparent bracket 80 can be omitted, and the planar optical waveguide 90 is directly assembled onto the second connection surface 72 of the coupling lens assembly 70.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
a first substrate comprising a supporting surface defining a receiving cavity;
a light emitting element received in the receiving cavity, and comprising a light emitting surface;
a first driving chip supported on the supporting surface, and electrically connected to the first substrate and the light emitting element;
a light receiving element received in the receiving cavity, and comprising a light receiving surface;
a second driving chip supported on the supporting surface, and electrically connected to the first substrate and the light receiving element;
a second substrate positioned between the first driving chip and the second driving chip;
a coupling lens assembly connected to the first and second driving chips;
a transparent bracket supported on the coupling lens assembly; and
an optical waveguide comprising a light guiding portion and a fixing portion surrounding the light guiding portion, the fixing portion connected to the transparent bracket to cause the optical waveguide to be connected to the coupling lens assembly, with the light guiding portion aligning with the light emitting surface and the light receiving surface;
wherein the light emitting element comprises a first light condensing lens formed on the light emitting surface, the light receiving element comprises a second light condensing lens formed on the light receiving surface, the second substrate and the first driving chip are spaced from each other, and cooperatively form a first light guiding hole between the second substrate and the first driving chip, the first light guiding hole aligns with the first light condensing lens and the light guiding portion, the second substrate and the second driving chip are spaced from each other, and cooperatively form a second light guiding hole between the second substrate and the second driving chip, the second light guiding hole aligns with the second light condensing lens and the light guiding portion.

2. The optical communication device of claim 1, comprising a connector, wherein the first substrate is supported on and electrically connected to the connector.

3. The optical communication device of claim 2, comprising a plurality of first connection balls, wherein the connector comprises a connection surface and a plurality of first connection pads formed on the connection surface, the first substrate comprises a bottom surface facing away from the supporting surface, the bottom surface is supported on the connection surface, the first substrate comprises a plurality of second connection pads formed on the bottom surface, each second connection pad spatially corresponds to a respective one of the first connection pads, each second connection pad is supported on and electrically connected to a respective one of the first connection pads through one of the first connection balls.

4. The optical communication device of claim 3, comprising a second substrate positioned between the first driving chip and the second driving chip, wherein the first substrate comprises a second connection pad and a third connection pad, both the second connection pad and the third connection pad are formed on the supporting surface, the first driving chip comprises a first surface facing the supporting surface, a second surface facing away from the first surface, a fourth connection pad, and a fifth connection pad, both the fourth connection pad and the fifth connection pad are formed on the first surface, the fourth connection pad is supported on and electrically connected to the second connection pad, the light emitting element comprises a sixth connection pad and a seventh connection pad, the sixth connection pad and the seventh connection pad are formed on the light emitting surface, the sixth connection pad is electrically connected to the fifth connection pad of the first driving chip, the second substrate comprises a third surface facing the supporting surface, and a fourth surface facing away from the third surface, the second driving chip comprises an eighth connection pad and a ninth connection pad, both the eighth connection pad and the ninth connection pad are formed on the third surface, the eighth connection pad is supported on and electrically connected to the third connection pad, the light receiving element comprises a tenth connection pad and an eleventh connection pad, the tenth connection pad and the eleventh connection pad are formed on the light receiving surface, the tenth connection pad is electrically connected to the ninth connection pad of the second driving chip, the second substrate comprises an upper surface, a lower surface facing away from the upper surface, a twelfth connection pad, and a thirteenth connection pad, both the twelfth connection pad and the thirteenth connection pad are formed on the lower surface, the twelfth connection pad is supported on and electrically connected to the seventh connection pad of the light emitting element, the thirteenth connection pad is supported on and electrically connected to the eleventh connection pad of the light receiving element.

5. The optical communication device of claim 4, comprising a second connection ball, third connection ball, a fourth connection ball, a fifth connection ball, a sixth connection ball, and a seventh connection ball, wherein the fourth connection pad is supported on and electrically connected to the second connection pad through the second connection ball, the sixth connection pad is electrically connected to the fifth connection pad through the third connection ball, the eighth connection pad is supported on and electrically connected to the third connection pad through the fourth connection ball, the tenth connection pad is electrically connected to the ninth connection pad of the second driving chip through the fifth connection ball, the twelfth connection pad is supported on and electrically connected to the seventh connection pad of the light emitting element through the sixth connection ball, the thirteenth connection pad is supported on and electrically connected to the eleventh connection pad of the light receiving element through the seventh connection ball.

6. The optical communication device of claim 4, wherein the second surface of the first driving chip defines a first location hole, the fourth surface of the second driving chip defines a second location hole, the coupling lens assembly comprises a first connection surface facing the first driving chip and the second driving chip, a second connection surface facing away from the first connection surface, and two first locating posts substantially perpendicularly extending from the first connection surface, the two first locating posts spatially correspond to the first locating hole of the first driving chip and the second locating hole of the second driving chip, respectively, the two first locating posts are inserted into the first locating hole and the second locating hole to assemble the coupling lens assembly onto the first driving chip and the second driving chip.

7. The optical communication device of claim 6, wherein the transparent bracket is supported on the second connection surface, the transparent bracket comprises a fifth surface facing the second connection surface, and a sixth surface facing away from the fifth surface, the optical waveguide is assembled on the sixth surface.

8. The optical communication device of claim 7, wherein the second connection surface of the coupling lens assembly defines two third location holes, the transparent bracket comprises two second locating posts substantially perpendicularly extending from the fifth surface, the two second locating posts spatially correspond to the two third locating holes of the coupling lens assembly, the two second locating posts are inserted into the third locating holes to assemble the transparent bracket onto the second connection surface of the coupling lens assembly.

9. The optical communication device of claim 7, wherein the sixth surface of the transparent bracket defines two fourth locating holes, two third locating posts extending from the fixing portion, each of the third locating posts spatially corresponds to a respective one of the fourth locating holes, the two third locating posts are inserted into the two fourth locating holes to assemble the planar optical waveguide onto the sixth surface of the transparent bracket.

10. The optical communication device of claim 1, wherein the coupling lens assembly comprises two light coupling lenses forming on the first connection surface, one of the light coupling lenses aligns with the first light guiding hole, the other of the light coupling lenses aligns with the second light guiding hole.

11. The optical communication device of claim 1, wherein the light emitting element is a laser diode, and the light receiving element is a photo diode.

* * * * *